INVENTOR.
Tracy C. Jarrett

March 31, 1970     T. C. JARRETT     3,503,196
VEGETABLE CROP HARVESTER

Filed Nov. 21, 1967     5 Sheets-Sheet 2

INVENTOR.
Tracy C. Jarrett
BY
Ralph F. Crandell
ATTORNEY

INVENTOR.
Tracy C. Jarrett

March 31, 1970     T. C. JARRETT     3,503,196
VEGETABLE CROP HARVESTER

Filed Nov. 21, 1967     5 Sheets-Sheet 4

INVENTOR.
Tracy C. Jarrett
BY Ralph F. Crandell
ATTORNEY

March 31, 1970     T. C. JARRETT     3,503,196
VEGETABLE CROP HARVESTER

Filed Nov. 21, 1967     5 Sheets-Sheet 5

INVENTOR.
Tracy C. Jarrett
BY
Ralph F. Crandell
ATTORNEY

United States Patent Office 3,503,196
Patented Mar. 31, 1970

3,503,196
VEGETABLE CROP HARVESTER
Tracy C. Jarrett, Denver, Colo., assignor to Jarrett Industries, Inc., Denver, Colo.
Filed Nov. 21, 1967, Ser. No. 684,682
Int. Cl. A01d 45/26
U.S. Cl. 56—327                                13 Claims

ABSTRACT OF THE DISCLOSURE

A vegetable crop harvester comprises a wheeled dirigible automotive vehicle having a platform thereon and crop cutting and lifting means secured to said platform in forwardly and downwardly extending relation thereto. A ground level sensing device positions the crop cutting and lifting means relative to the ground, and power means are provided for driving said crop cutting and lifting means to cut the crops at or near ground level, pick up said crops and lift the same to the platform. Various crop trimming, inspecting, sorting and packaging stations are located on the platform for handling the cut crops.

BACKGROUND OF THE INVENTION

This invention relates to vegetable crop harvesting machines, and more particularly to combine-type agricultural harvesting machines finding particular but not necessarily exclusive use for harvesting a variety of edible vegetable plants characterized in general by a short stem and leaves which may form and develop into a dense, compact head, or by blanched stalks which are moderately compact. Illustrative of such crops are head lettuce, leaf lettuce, cabbage and celery.

The crop harvesting machines herein described combine a number of operations incident to the cutting and packaging of the headed vegetable crops, including severing the crops in the growing bed, picking up the severed crops, and conveying the crops to trimming, inspecting, sorting and packing stations on the harvester vehicle.

In its principal aspects, the present invention is concerned particularly with the cutting and lifting of ripened vegetable heads from a growing bed to trimming, inspecting and packaging stations on the harvester vehicle. It is particularly important that the crops be properly cut to provide the optimum number of leaves, and that the cut crops be elevated or lifted to the working deck of the vehicle without bruising or damaging the tender leaves. In the case of head lettuce, for example, if the heads are bruised during the cutting and lifting operation, they will rapidly deteriorate to an unmarketable condition.

While the present invention will be described principally in connection with the harvesting of head lettuce, it will be appreciated that the harvester is not limited to such use, but is well adapted for satisfactory use with any compact edible vegetable product or other vegetable products which can be cut at or near ground level and elevated to handling stations for further processing.

In the case of head lettuce, it is conventional farming practice to plant this crop in elongated beds with two parallel rows of lettuce plants in each bed. An irrigation ditch runs between adjacent beds so that the field gives the appearance of a plurality of parallel strips of double-rowed beds. As the lettuce plants mature, the heads are formed. Modern farming methods have resulted in the development of lettuce plants the majority of which mature at the same time. Nevertheless harvesting methods are, for the most part, still carried out manually. A crew of harvest workers goes down each bed and harvests the bulk of the crop. When harvesting is done manually, it is the usual procedure for the crew to go over the field a second time at a later date after the remaining plants have matured. It will be appreciated that manual harvesting is necessarily slow and many good crops are lost by being overlooked and left in the field even though the field is given a second cutting. It is believed therefore, that to effect a once-over complete harvesting of the entire field is a novel and heretofore unobvious approach.

The harvesting machine described herein affords the following operations which are carried out in a once-over harvesting of a complete field of lettuce or other head crop:

(1) Cutting or severing the marketable portion of the head from the root stalk, stem or trunk.

(2) Picking the severed portion off of the ground and lifting it to a work deck or platform.

(3) Conveying crop to trimming, inspecting and packaging stations located on the platform.

(4) Packing the vegetable in a carton or other container and closing and sealing the container for conveyance to a truck for transport of the product to market.

The various operations performed on the crop once the same has been harvested and lifted to the packaging stations will depend upon the particular crop being harvested and the desired condition of the package for market. For example, each individual head of lettuce may be trimmed, inspected, and wrapped with a clear plastic wrapper and then placed in a box or crate for shipment. The inspecting and subsequent operations are carried out in the field thus eliminating subsequent handling and thereby reducing the amount of damage to the harvested crops. Handling time and expense is reduced resulting in increased profits for the farmer.

OBJECTS OF THE INVENTION

It is the principal object of the present invention to provide a harvester for head lettuce, and like vegetable plants having a well-formed, dense, compact, edible structure, by means of which the crop can be harvested, trimmed, inspected and packaged in a once-over operation in the field in which the crop is grown.

Another object of the invention is to provide a harvester mechanism for cutting and elevating formed crops, such as head lettuce, from the growing beds to trimming, inspecting and packaging stations, without damaging or bruising the harvested crop and at a rate sufficient to afford economical trimming, inspecting and packaging operations on the product as it is harvested.

A further object of the present invention is to provide a harvester mechanism of the foregoing character which will cut growing crops at substantially ground level and lift the cut crops to an elevated handling station in a rapid and efficient manner without bruising or otherwise damaging the crops.

A more specific object of the present invention is to provide a cutting and lifting mechanism finding particular but not necessarily exclusive use with formed vegetable shaped crops, which mechanism will cut the crops in the growing bed, pick up the crops from the ground, hold the same without injuring them while conveying them upwardly to elevated packaging and handling stations.

Still another object of the present invention is to provide a crop cutting and conveying apparatus which will sever the crops from the root or stem at the optimum cutting position in order to provide a maximum size formed crop with a minimum of waste.

Still a further object of the present invention is to provide a headed or formed crop lifting conveyor mechanism which will elevate cut head crops while holding the same rigidly and without permitting the crop to rotate or roll or bump other cut crops during the lifting operation.

Still a further object of the present invention is to provide a crop harvester with a cutting and elevating mechanism capable of following the ground contour of the beds in which the crops are growing.

Other objects and advantages of the present invention will become apparent to those skilled in the art upon reading the following description and drawings.

SUMMARY OF THE INVENTION

In summary, the crop harvester herein described comprises a dirigible automotive vehicle with a wheeled chassis, a platform superstructure mounted on said chassis, and a control station on said chassis adjacent the front end thereof. A support frame is mounted on said platform superstructure adjacent said control station and extends downwardly and forwardly of said platform. A cutter and lifting conveyor carriage is slidably mounted on said frame and extends therefrom into ground juxtaposition. Crop cutting means are mounted on the forward end of said carriage, and conveyor means are mounted on said carriage for picking up and lifting cut crops from the ground to the platform. The conveyor structure includes a pair of lifting conveyor belts with a superimposed soft yieldable hold-down bet. A hydraulic ram is provided between the support frame and the carriage for traversing the carriage on the frame to selectively position the carriage at a predetermined cutting height with respect to the ground. A ground engaging sensing wheel controls the ram to maintain said carriage at a preselected operative crop cutting position relative to the ground. Various crop handling and packaging stations are provided on the platform to receive the field crops which are cut and lifted to the platform.

DESCRIPTION OF THE PREFERRED EMBODIMENT

Figure 1:
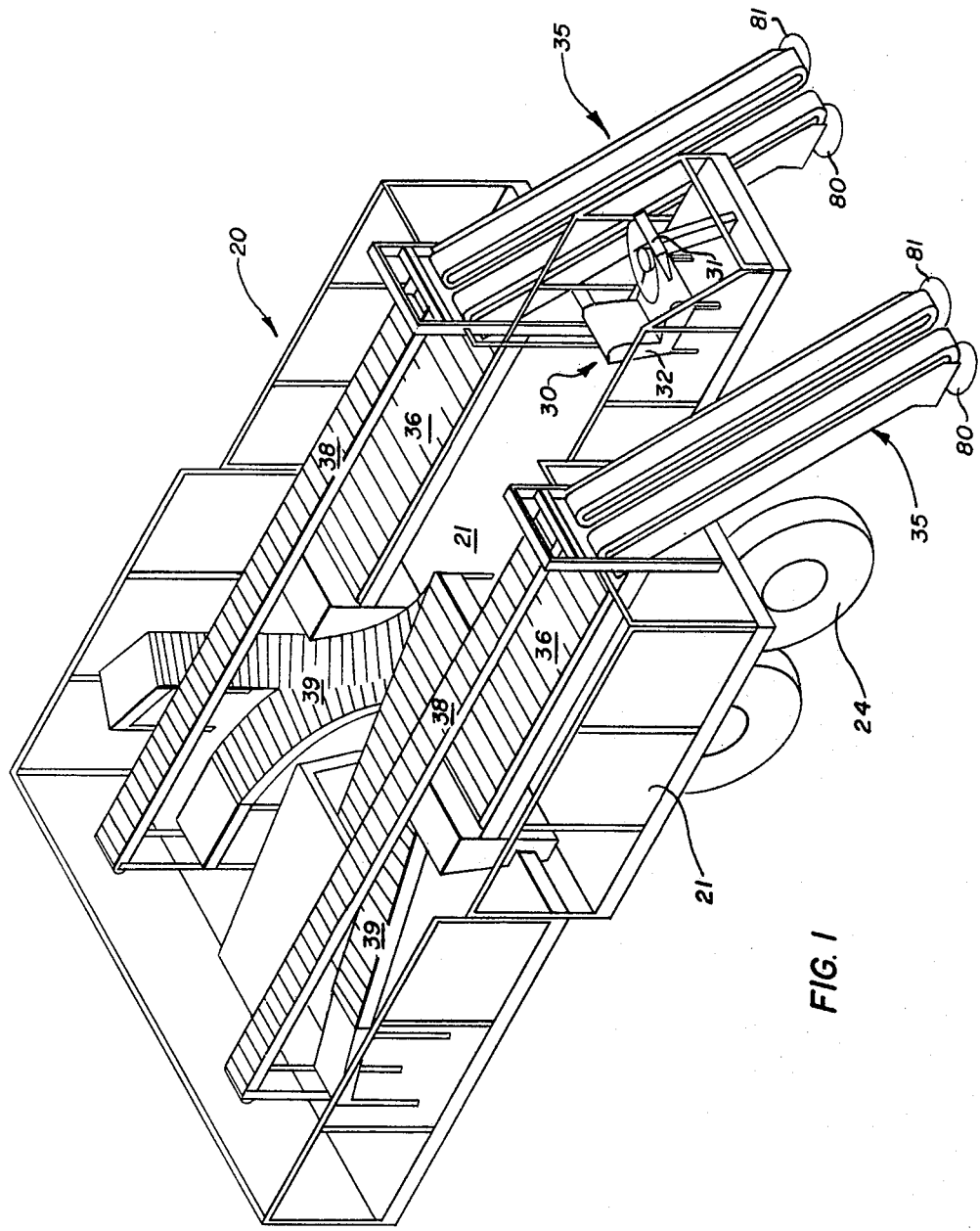
FIG. 1, a generally schematic perspective view of a harvester embodying the invention.
Figure 2:
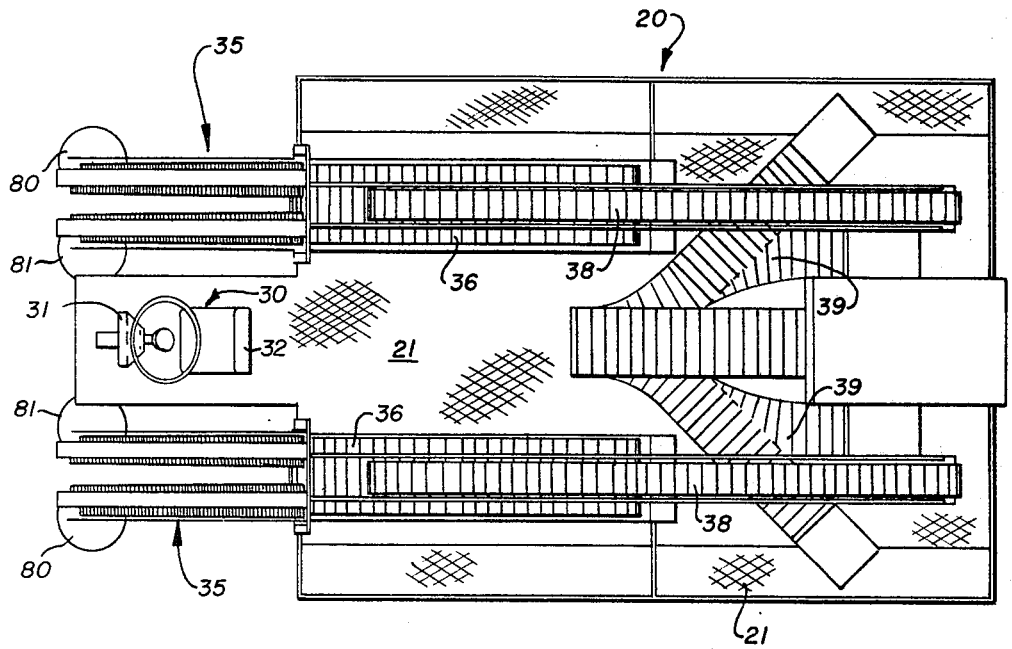
FIG. 2, a plan view of the harvester shown in FIG. 1.
Figure 3:
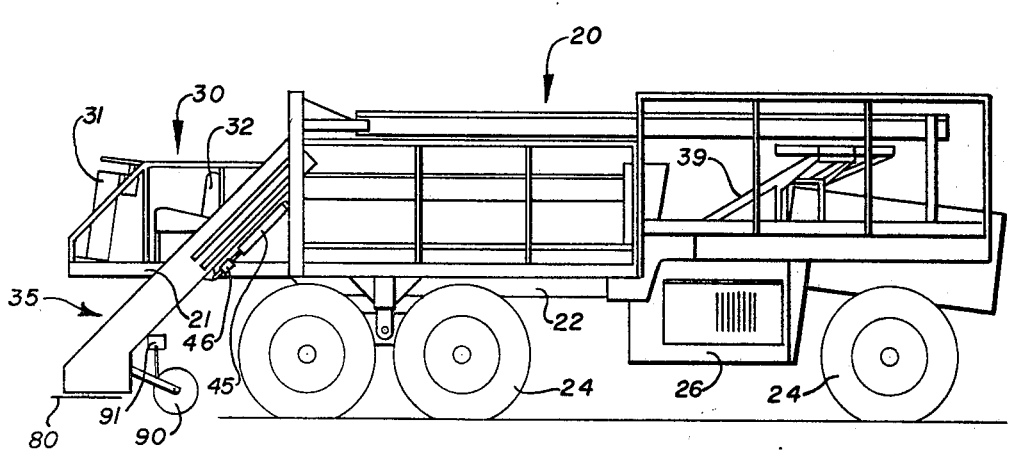
FIG. 3, a side elevation view of the harvester shown in FIG. 1.
Figure 4:
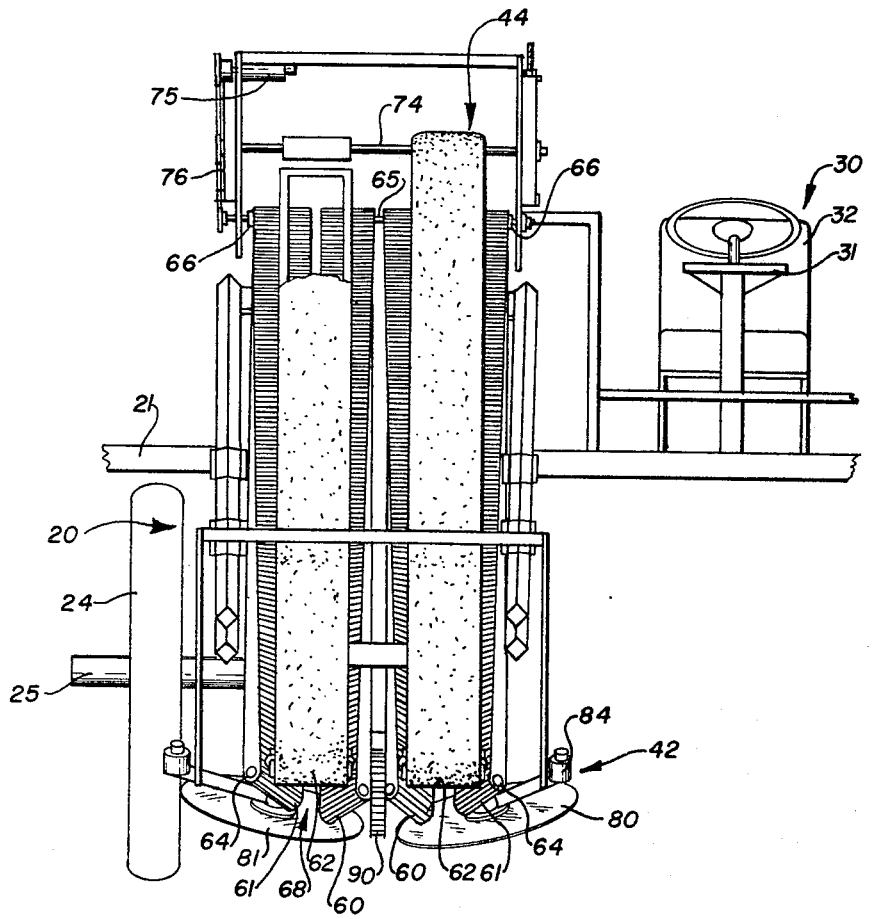
FIG. 4, a partial enlarged front elevational view, with certain parts cut away to reveal constructional details.
Figure 5:
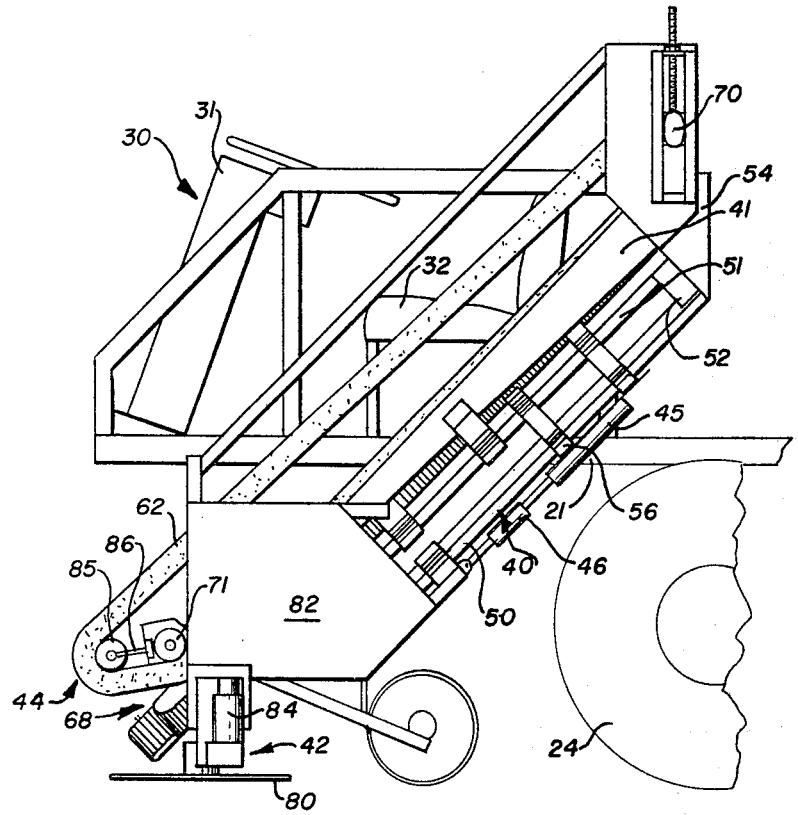
FIG. 5, a partial, enlarged, side elevational view of the front end of the harvester shown in FIG. 3.
Figure 6:
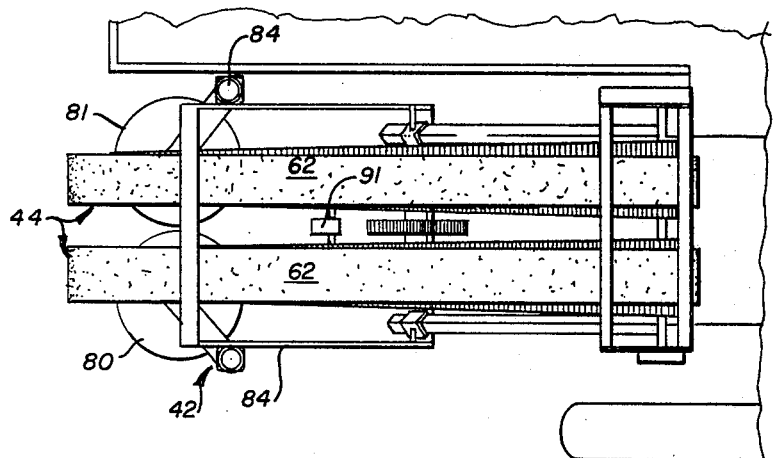
FIG. 6, a plan view of the portion of the harvester structure shown in FIG. 5.

The crop harvester embodying the invention is shown in detail in the accompanying drawings. The harvester there shown comprises a wheeled dirigible, self-propelled vehicle 20 having a superstructure defining a work deck or platform 21 mounted on a wheeled chassis 22. The vehicle wheels 24 are so spaced that they travel in the conventional irrigation ditches which are defined along the sides of beds containing rows of growing crops.

For purposes of illustration, the harvester will be described in conjunction with and as illustrative of the harvesting of head lettuce. As will be appreciated however, the harvester herein described need not be restricted to such a single crop, but will find utility in the harvesting of many formed crops. In the case of lettuce, it is conventional practice to plant head lettuce plants in spaced beds, each bed of which contains two rows of lettuce heads, which beds are separated by irrigation ditches. In order to adapt the vehicle for use in various fields, conventional provisions may be made for lateral adjustment of the wheels 24 on the vehicle axles 25. The harvester as shown in the drawings is adapted to straddle two beds and cut the heads in alternate beds.

The harvester is powered by an internal combustion engine 26 which in turn drives one or more hydraulic or pressure fluid pumps (not shown). Conventionally, such pumps circulate pressure fluid from a supply reservoir through various control valves to fluid pressure driven motors connected to the various operating parts of the harvester mechanism. For example, the wheels are driven by fluid pressure motors drivingly connected by means of appropriate transmission structures to the vehicle wheels.

The various driving, steering, cutting and conveyor mechanisms of the harvester are under the control of an operator located at a control station 30 mounted on the platform 21 at the forward end of the vehicle. The station 30 includes a valve control console 31 with appropriate steering controls conveniently positioned around a driver's seat 32. As hydraulic controls for vehicles, tools and the like are conventional and well known in construction, it is deemed unnecessary to present a detailed description of such hydraulic controls, circuits, pumps, etc. in connection with this invention. Suffice it to say that the flow of pressure fluid from the supply source through the pumps to the motors are controlled by manual and solenoid actuated valves, associated electrical controls and the necessary conventional check valves and other items associated with hydraulic control and power systems. It will also be appreciated and understood that other equivalent forms of power may be utilized. For example, the main engine may drive a generator which in turn supplies electrical power to electric motors for purposes of driving the various moving parts of the vehicle such as the cutter heads, conveyors, etc. Furthermore alternative forms of controls, such as a pneumatic system may be used to advantage.

The platform 21 mounted on the vehicle chassis 22 affords a deck on which the various crop handling stations may be located, and also provides the basic support structure for the cutting and elevating conveyor mechanisms to be described herein. The cutting and lifting conveyor devices 35 are positioned on each side of the control station 30 and serve to cut and lift the head crops upwardly to further conveyors located at the various stations on the platform. In the mechanism shown, heads of lettuce severed from the growing beds and are lifted and deposited on trimming conveyors 36 which carry the heads past the trimming station. At this station the trimmers cut excess leaves from the heads and prepare them for packaging. The heads are then manually placed on inspecting conveyors 38 where they are inspected prior to packaging. The inspecting conveyors travel the length of the platform and carry the trimmed heads to the packaging stations.

At the packaging stations operators perform any necessary and desirable operations on the crops and then package them in cases or crates. The cases are placed onto a roller conveyor 39 which carries the cases to an automatic closing and sealing mechanism. The sealed cases are then discharged from the harvester onto trucks or placed on the ground for subsequent loading. The roller conveyor 39 directs the cases rearwardly and downwardly from the platform 21 for subsequent handling. The structure of the platform mounted conveyors is conventional and may take any suitable configuration. The harvester is versatile and may be adapted for use with various sizes and types of crops according to the particular need.

As the harvester proceeds through a field of growing crops, it cuts the crops from the beds and lifts the cut crops to a platform where various trimming, inspecting and packaging operations take place. For this purpose the harvester includes a cutting and lifting device organization 35. In the illustrated form of the harvester, two such cutting and lifting devices 35 are provided, one at each side of the driving and control station 30, mounted on the platform so as to extend downwardly towards the ground in front of the vehicle. The cutting and lifting devices are further so mounted that the harvester operator can observe the cutting and lifting operation at all times.

In order that the position of the cutting blade may be adjusted relative to the ground on which the crops are growing and further in order that the entire cutting and lifting assembly may be elevated so that the vehicle may be moved from field to field, the lifting conveyor and cutter blade device 35 is adapted for inclined movement towards and away from the ground. To this end, the cutting and lifting device 35 includes a carriage support 40 mounted in fixed relation on the platform 21 and extending outwardly and downwardly therefrom. Slidably supported on the carriage support 40, is a movable carriage 41 which mounts the cutter blade assembly, indicated generally at 42, and the lifting conveyor assembly indicated generally at 44. For sliding the carriage 41 on the support there is provided a hydraulic ram 45 mounted at one end on support 40. At its other end, the ram 45 is connected to the carriage 41. The ram 45 serves to lift the carriage 41 upwardly into traveling position, or lower the carriage towards the ground, and further serves to adjust and position the cutting blade assembly 42 at optimum cutting position relative to the ground when the harvester is cutting crops from the field.

The carriage support structure indicated generally at 40, comprises a rigid frame 50 having a plurality of rectangular, elongated slide supporting members 51 joined at their ends by cross members 52 to form a rectangular structure. The carriage support structure 40 is mounted on the platform 21 by rigid brackets 54. The slide supporting members 51 are shown as being generally square in cross section and are positioned to define carriage supporting ways with one angle of the member extending upwardly from two sloping sides to define a ridge.

The carriage 41 is mounted on the carriage support structure 40 by means of slide clamps 56 which slidably engage the slide members 51 and straddles the ridge thereof. Because two rows of head lettuce are cut in each bed, a pair of lifting conveyor mechanisms are provided on each carriage 41. Each lifting conveyor is composed principally of three elements, two lower lifting conveyor belts 60, 61 and an upper hold down conveyor belt 62. The lower conveyor belts 60, 61 are supported by idler pulleys 64 and driven by a drive shaft 65 on which is mounted drive pulleys 66. It will be noted that at the lower pick-up end, the lifting belts 60, 61 are turned at an angle to each other so as to form a groove 68, while at the upper end the belts flatten out to a generally coplanar relationship.

In order to hold a head of lettuce on the lifting belts and prevent it from rolling or turning, the hold-down belt 62 is positioned above the lifting belts and is formed of a soft flexible yieldable material, such as foam rubber or polyurethane foam. Adjusting means 70 are provided to raise or lower the hold-down belt with respect to the lifting belts 60, 61. The hold-down belt 62 is supported at its lower end by an adjustable idler pulley 71 and at its upper end by a drive pulley 72 on a drive shaft 74.

In order that the belts all work in unison, both drive shafts 65 and 74 are driven by a hydraulic motor 75 connected thereto by an appropriate gear and chain drive mechanism 76. The hydraulic motor 75 is supplied with pressure fluid from the main hydraulic pump on the vehicle.

The heads of lettuce or like crops are severed from the ground by the cutter assembly 42 which comprise a pair of rotary cutter blades 80, 81 positioned under the leading end of the lifting belt conveyor mechanism, and mounted on the carriage 52 by support plates 82. The blades are driven by a hydraulic motor 84 mounted on the support plates 82.

To insure that the cut heads of lettuce are picked up by the lifting conveyors, the inner conveyor belt 60 may be positioned slightly ahead of the outer conveyor belt 61. This positioning serves to guide the cut heads into the V-groove 68. To further insure a positive pick-up of the cut heads, provision is made to adjust the nose of the hold-down conveyor belt 62 to increase or reduce the clearance between the hold-down belt 62 and the ground. For this purpose a nose adjusting pulley means 85 is provided for each hold-down belt 62. The angle which the adjusting pulley 85 makes with respect to the idler pulley 71 can be adjusted by screw controlled bracket 86 to vary the inlet throat between the hold-down conveyor nose and the ground.

During cutting operations it is desirable that the conveyor and cutter wheels follow the ground contour. For this purpose a sensing wheel 90 is swingably mounted on the carriage in position to engage the ground over which the harvester is traveling. Operatively associated with the sensing wheel is a control valve 91 which controls the application of pressure fluid to the lifting ram 45 thereby to raise or lower the carriage 41 in accordance with the position of the sensing wheel 90 on the ground. When the sensing wheel drops into a depression, the ram 45 is extended and the carriage 41 is lowered thereby lowering the cutter wheels and conveyor belts. Conversely, when the sensing wheel 90 rises, the carriage 41 is correspondingly raised on the frame 40.

Figure 8:
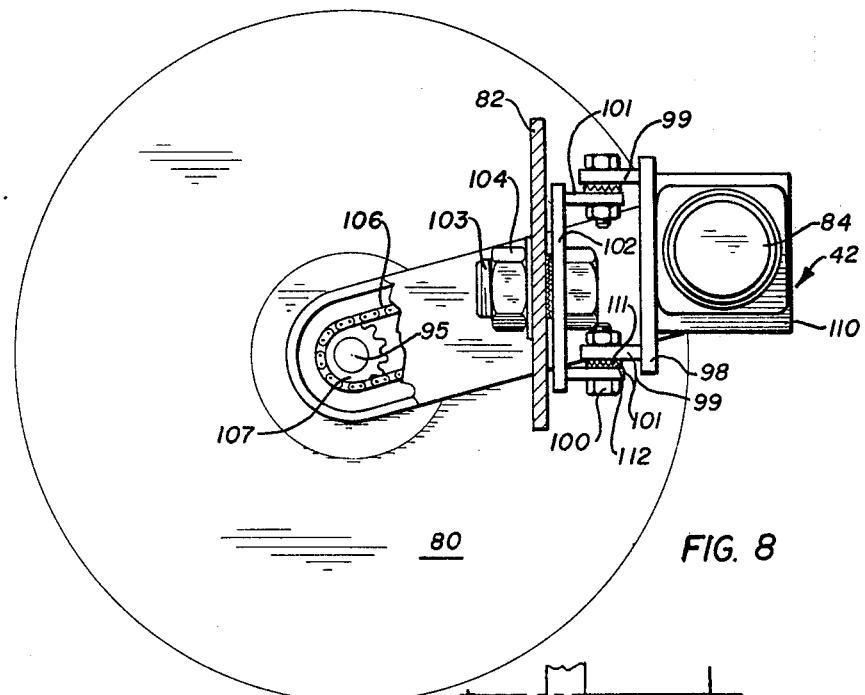
FIG. 8, a plan view of the harvester cutter mechanism shown in FIG. 7.
Figure 7:
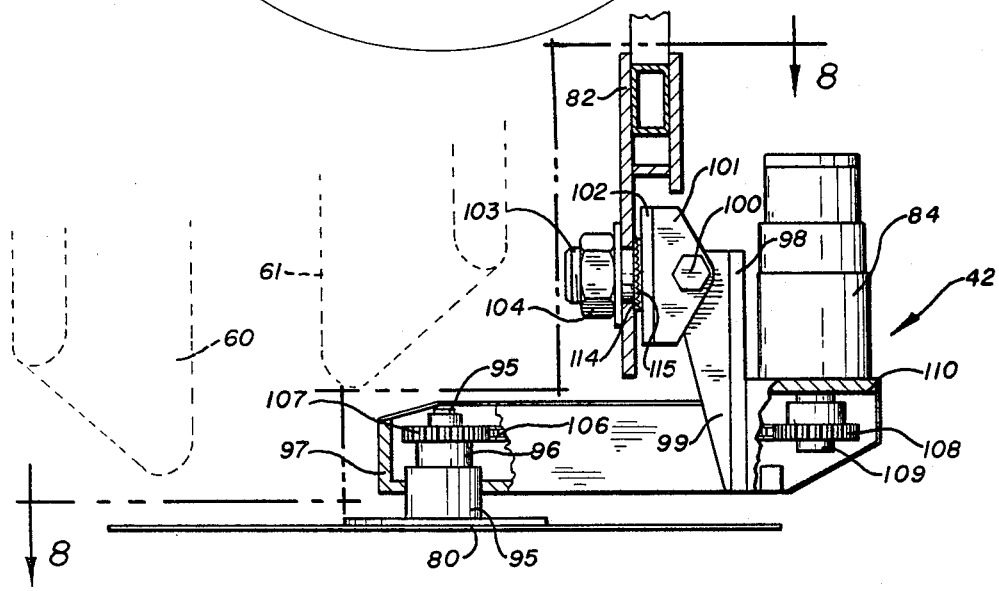
FIG. 7, an enlarged, fragmentary front elevational view of a portion of the harvester cutter and conveyor mechanism shown in FIG. 4 with certain parts cut away to reveal constructional details.

It is common practice for many vegetable beds to be given a slight slope for purposes of drainage. In some cases, the beds are tilted at the rather severe angle of three to five degrees. To accommodate the harvester to such tilted beds, it is desirable that the cutting saws be variable in angle from a generally flat position to a tilted position. To this end, the cutting saws are mounted on the harvester by means of an adjustable bracket construction. Referring to FIGS. 7 and 8 of the drawing, there is shown in detail the cutter blade assembly 42. Each cutter blade 80 is provided with a stub shaft 95 journaled for rotation in a bearing 96, supported in a generally horizontally extending frame 97. This frame includes an upstanding bracket arm 98 having a pair of apertured ears 99 adjustably supported by means of pins 100 on corresponding ears 101 extending from a cross member 102. The cross member 102 is in turn pivotally mounted, by a bolt 103 and nut 104, on the support plate 82. The blade 80 is driven by means of a chain 106 which engages a sprocket 107 on the shaft 95 and a corresponding sprocket 108 on the shaft 109 of the motor 84. The motor is mounted on a bracket 110 secured to the upstanding support arm 98.

To prevent relative movement between the cutter blade frame 97 and the support plate 82 when all bolts and nuts are tightened, there are provided serrated engaging surfaces 111 and 112 on the corresponding ears 99 and 101 respectively. Similarly, engaging serrated surfaces 114, 115 are provided between the bracket 102 and the support plate 82 respectively. With the foregoing arrangement, it will be appreciated that the cutter blades 80, 81 can be adjusted about a plurality of axes and positioned at an angle with respect to the growing bed of crops, and then tightly clamped in the desired position.

It will be further appreciated that the relationship between the cutting blades and the pickup and hold-down belts is important in order to insure that the crops are severed and properly picked up from the ground. Thus, the hold-down belt 44 extends over the cutting blade and slightly in front of the leading edge thereof while the pick-up belts are positioned in close juxtaposition to the rotating blade, but slightly behind the cutting edge thereof. Thus, the rotating cutting blades have a tendency to feed the cut crops directly into the pickup mechanism. As described above, adjustment of the nose of the hold-down belt is further provided to enhance this pickup action.

I claim as my invention:

1. A vegetable crop harvester for performing a non-selective once-over harvesting operation on a field of vegetable crops, said harvester comprising, in combination, a dirigible automotive vehicle, a platform carried on said vehicle, means for cutting crops at substantially ground level, lifting means for lifting cut crops from the ground to said platform including a lifting conveyor and a superimposed soft, yieldable hold-down belt, means mounting said lifting means on said platform in forwardly and downwardly extending relation thereto, means mounting said cutting means on the forward end of said mounting means for said lifting means, means for positively positioning said lifting means and said cutting means at a predetermined relationship to the ground surface, and power means for driving said crop cutting and lifting means whereby the crops are cut at substantially ground level, and lifted to the platform.

2. A vegetable crop harvester as defined in claim 1 where said mounting means for said lifting means includes a forwardly and downwardly extending frame structure rigidly secured to said platform and defining inclined ways, and a carriage slidably mounted on said ways and supporting said cutting means and said lifting means.

3. A vegetable crop harvester as defined in claim 2 wherein said positively positioning means includes means operatively mounted between said carriage and said frame for traversing said carriage on said ways whereby to positively position said cutting means and lifting means at a predetermined level relative to the ground surface.

4. A vegetable crop harvester as defined in claim 3 including ground engaging control means mounted on said carriage for sensing the position of said carriage relative to the ground and means operatively connecting said sensing means to said traversing means for controlling the latter to position said carriage on said ways and thereby maintain the position of said cutting means and lifting means at a predetermined relationship with the ground surface.

5. A vegetable crop harvester as defined in claim 3 including ground sensing means for generating a signal and means operatively positioning said carriage on said ways in response to said signal.

6. A vegetable crop harvester as defined in claim 1 wherein said platform includes crop handling and packaging stations for receiving and processing crops cut and lifted thereto.

7. A vegetable crop harvester for performing a nonselective once-over harvesting operation on a field of vegetable crops, said harvester comprising, in combination, a dirigible automotive vehicle, a platform carried on said vehicle, lifting conveyor means extending in forwardly and downwardly directed relation to said platform, said lifting conveyor means including a pair of lifting conveyor belts and a superimposed, soft, yieldable hold-down belt, means mounting said lifting conveyor means on said platform for inclined traversing movement with respect thereto, cutting means, means adjustably mounting said cutting means on the forward end of said lifting conveyor means for cutting crops at substantially ground level and feeding the same to said lifting conveyor means, ground engaging sensing means on said lifting conveyor mounting means for controlling the same to maintain said cutting means at a predetermined relationship to the ground level, and power means for driving said cutting means and said lifting conveyor means whereby crops are cut, picked up, and lifted to the level of said platform as the harvester traverses a field of crops.

8. A vegetable crop harvester as defined in claim 7 wherein said pair of lifting conveyors are positioned relative to each other so as to define at their forward end a generally V-shaped channel and be generally coplanar at their rearward ends, said power means driving said belts at a uniform constant speed whereby crops are lifted without turning or rolling.

9. A vegetable crop harvester as defined in claim 7 wherein said pair of lifting conveyors are positioned relative to each other so as to define at their forward end a generally V-shaped channel and at their rearward end a relatively shallower V-shaped channel, said power means driving said belts at a uniform constant speed whereby crops are lifted without turning and rolling.

10. A vegetable crop harvester for performing a nonselective once-over harvesting operation on a field of vegetable crops, said harvester comprising, in combination, dirigible automotive vehicle, a platform carried on said vehicle, a control station on said chassis adjacent the front end thereof, a support frame mounted on said platform adjacent said control station and extending downwardly and forwardly thereof, a carriage slidably mounted on said frame and extending therefrom into ground juxtaposition, crop cutting means mounted on the forward end of said carriage, conveyor means mounted on said carriage for picking up and lifting cut crops from the ground to the ground to the platform, said conveyor including a pair of lifting conveyor belts and a superimposed, soft, yieldable, hold-down belt, ground engaging sensing means on said carriage, power means operatively connecting said support frame and said carriage for traversing said carriage on said frame to selectively position the carriage at a predetermined cutting height with respect to the ground, and means operatively associated with said sensing wheel for controlling said power means to maintain said carriage at a preselected operative crop cutting position relative to the ground, whereby crops are cut, picked up and lifted to the level of said platform as the harvester traverses a field of crops.

11. A vegetable crop harvester mechanism adapted to be mounted on a platform carried on a wheeled dirigible automotive vehicle for cutting crops growing in elongated beds and lifting said crops to the level of the platform, said crops harvester mechanism comprising, in combination, a rigid frame adapted to be secured to said chassis in downwardly inclined relation thereto and defining parallel slide-ways, a lifting conveyor carriage slidably mounted on said ways and extending in downwardly inclined relation between said platform and the ground, power means for traversing said carriage on said ways to position the leading end of said carriage with respect to the ground, lifting conveyor means on said carriage including a pair of lifting conveyors and a superimposed holddown conveyor belt, said lifting conveyors being generally coplanar adjacent said platform and defining a V-shaped channel adjacent the ground, said holddown conveyor belt being of soft, yieldable material, and means on said carriage including a pair of generally horizontal circular cutting blades for severing crops and feeding the same to said conveyor.

12. A vegetable crop harvester mechanism as defined in claim 11 wherein said mechanism includes ground sensing means mounted on said carriage, and means operatively connecting said ground sensing means to said carriage power means for slidably traversing said carriage on said frame as a function of the ground contour whereby to maintain a constant spacing between the cutting blades and the ground.

13. A crop harvester mechanism as defined in claim 11 including means mounting the circular cutting blades on said carriage for relative angular adjustment with respect thereto.

References Cited

UNITED STATES PATENTS

| | | | |
|---|---|---|---|
| 2,402,201 | 6/1946 | Martin | 56—328 |
| 2,993,322 | 7/1961 | Wiebe | 56—328 |
| 3,078,926 | 2/1963 | Ries et al. | 56—327 XR |
| 3,178,873 | 4/1965 | Meyer | 56—27.5 |
| 3,267,653 | 8/1966 | Dawalt et al. | 56—11 |
| 3,380,237 | 4/1968 | Garrett | 56—327 |
| 3,393,501 | 7/1968 | Meyer | 56—327 |
| 3,426,515 | 2/1969 | Boyer | 56—327 |

RUSSELL R. KINSEY, Primary Examiner